TURNTABLE FOR MAGNETIC RECORDER

Filed Oct. 30, 1953 4 Sheets-Sheet 1

INVENTORS
FRANK E. RUNGE
WILLIAM H. LYON
DONALD F. BALMER
BY H. G. Manning
ATTORNEY Nov. 11, 1958 F. E. RUNGE ET AL 2,860,191

TURNTABLE FOR MAGNETIC RECORDER

Filed Oct. 30, 1953 4 Sheets-Sheet 2

INVENTORS
FRANK E. RUNGE
WILLIAM H. LYON
DONALD F. BALMER

BY H. G. Manning
ATTORNEY

INVENTORS
FRANK E. RUNGE
WILLIAM H. LYON
DONALD F. BALMER
BY H. G. Manning
ATTORNEY

TURNTABLE FOR MAGNETIC RECORDER

Filed Oct. 30, 1953 4 Sheets-Sheet 4

INVENTORS
FRANK E. RUNGE
WILLIAM H. LYON
DONALD F. BALMER
BY H. G. Manning
ATTORNEY 2,860,191
Patented Nov. 11, 1958

2,860,191

TURNTABLE FOR MAGNETIC RECORDER

Frank E. Runge, Branford, William H. Lyon, Orange, and Donald F. Balmer, East River, Madison, Conn., assignors to The Soundscriber Corporation, New Haven, Conn., a corporation of Connecticut

Application October 30, 1953, Serial No. 389,444

11 Claims. (Cl. 179—100.2)

This invention relates to sound recording and reproducing devices, and more particularly to a long-playing magnetic recording and playback apparatus, wherein the sound is recorded transversely on a wide strip of flexible tape having on one side an emulsion of magnetic particles.

One object of the present invention is to provide a practical magnetic recording and reproducing apparatus of the above nature having a series of successive substantially parallel arcuate sound tracks impressed laterally across a slowly moving recording magnetic tape by means of a plurality of electromagnetic transducer heads radially disposed on a rotating turntable member located under said tape.

A further object is to provide an apparatus of the above nature in which the turntable may be laterally removed from the driving mechanism for replacement or repair, whenever necessary, by first causing its spindle to drop down below said turntable.

A further object is to provide an apparatus of the above nature having an improved form of turntable provided with a plurality of spaced magnetic recording and playback heads which generate magnetic tracks on the tape with precision under uniform pressure for producing accurate right angle contact with said tape.

A further object is to provide an apparatus of the above nature having an improved connection between the turntable member and its drive spindle, which will filter rotational disturbances so as to provide an extremely accurate rotational speed and reproduction fidelity.

A still further object is to provide an improved cover for the turntable of such an apparatus in which said cover has a raised rib through which the transducer heads are adapted to project, said rib serving for smoothing the tape prior to the engagement of the heads therewith.

A further object is to provide an apparatus of the above nature which will be simple in construction, inexpensive to manufacture, easy to install and manipulate, compact, ornamental in appearance, and very efficient and durable in use.

With these and other objects in view, there has been illustrated on the accompanying drawings, one form in which the invention may conveniently be embodied in practice.

The present invention relates to an improvement over the invention disclosed in the copending application of Lincoln Thompson, Frank E. Runge and William H. Lyon, Serial Number 255,184, filed November 7, 1951, entitled "Long Playing Magnetic Tape Recorder"; an application of William H. Lyon, Serial Number 284,716, filed April 28, 1952, entitled "Automatic Synchronization Apparatus for Long Time Transverse Magnetic Sound Recorder and Reproducer"; an application of Lincoln Thompson, Frank E. Runge, and William H. Lyon, Serial Number 327,834, filed December 24, 1952, entitled "Scanning Mechanism for Magnetic Tape Recorders"; an application of William H. Lyon, Serial Number 350,481, filed April 22, 1953, entitled "Knee Action Pressure Plate for Magnetic Tape Recorder"; and an application of Frank E. Runge, Serial Number 368,851, filed July 20, 1953, entitled "Turntable Changing Mechanism for Magnetic Recorder."

Figure 1:
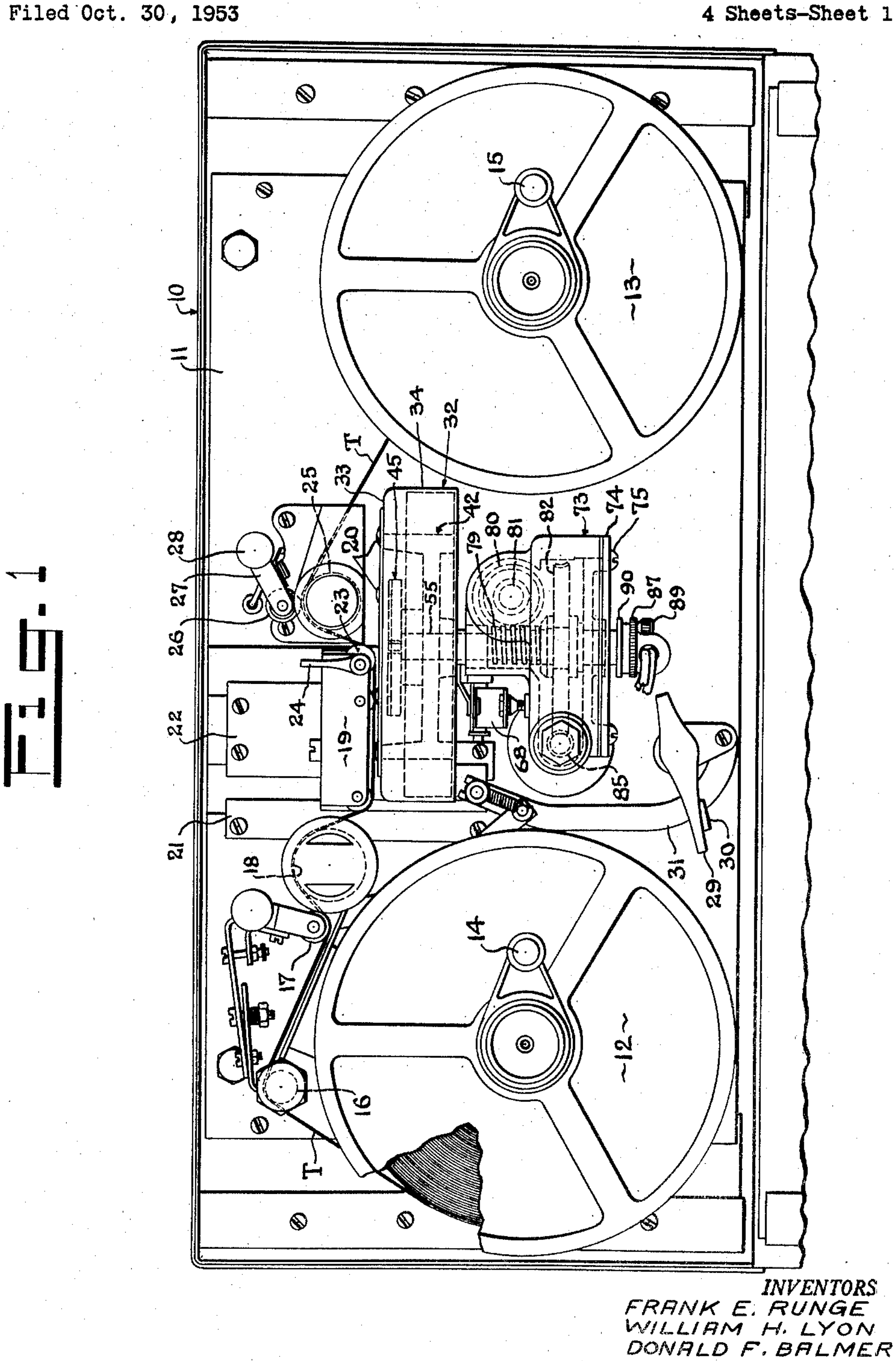
Fig. 1 represents a front view in elevation of a magnetic recorder and reproducer having the improved removable turntable mechanism embodied therein.
Figure 2:
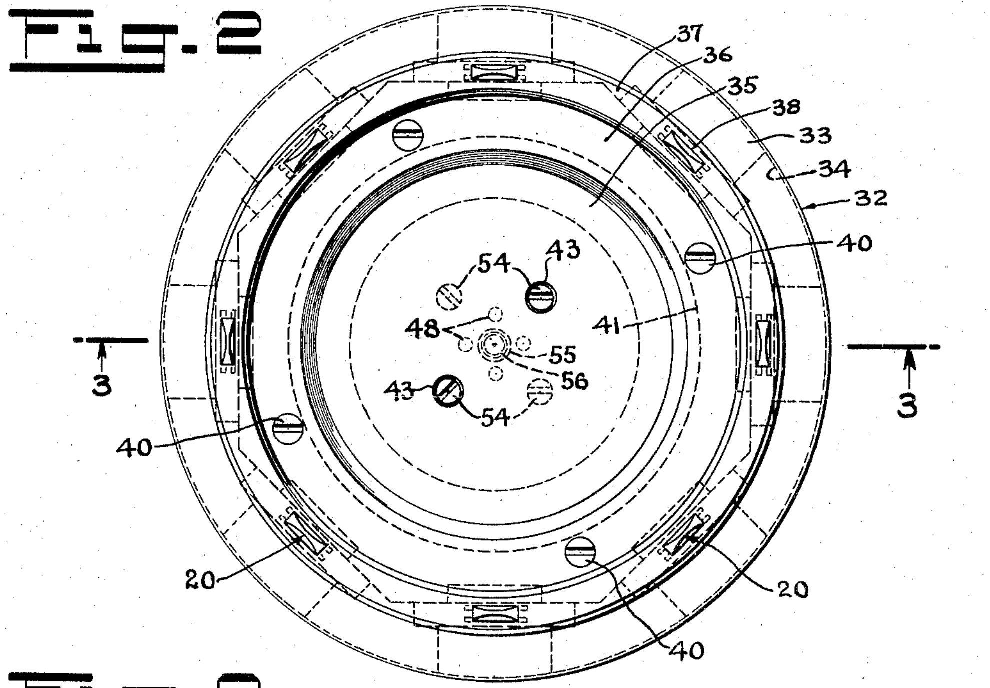
Fig. 2 is a top plan view of the removable turntable shown by itself, and illustrating the location of the transducer heads mounted thereon.

Referring now to the drawings in which like reference numerals denote corresponding parts throughout the several views, the numeral 10 indicates generally the cabinet of the improved apparatus, and the numeral 11 the chassis on which the working parts are mounted.

The chassis 11 is provided with a feed reel 12 and a takeup reel 13 which are operated by means of handles 14, 15, respectively, for adjusting and feeding purposes.

Mounted upon the chassis 11 is a horizontal guide spindle 16 over which the tape T passes after leaving the feed reel 12.

From the guide spindle 16, the tape T passes under a tapered roller 17 and over a guide drum 18, from which it passes beneath a pressure gate 19, which forces it into contact with the transducer heads 20, of which there are eight in number, for a purpose to be hereinafter fully described.

The pressure gate 19 is mounted for vertical sliding movement in a pair of ways 21, 22 attached to the chassis 11.

The tape T is adapted to pass under an eccentric roller 23 mounted on the pressure gate 19, and having a front handle 24 for use in synchronizing the tracks which have been recorded on the tape with respect to the path on the rotary transducer heads 20, during playback. The tape T also passes over a drive roller 25 and under a pressure roller 26, which is mounted upon an arm 27 pivoted upon a pin 28, as clearly shown in Fig. 1.

In order to facilitate the feeding, handling and loading of the tape into the apparatus, provision is made of a scan lever 29 and a load lever 30, the latter of which is connected to an operating linkage 31, as fully described in the prior applications above referred to.

The transducer heads 20 are carried on a removable turntable 32 which is provided with a hollow magnetic cover shield 33 having a cylindrical skirt 34.

The top of the turntable shield 33 is provided with a central depressed section 35, surrounding which is an annular intermediate section 36 and a raised rib 37 having eight uniformly spaced elongated slots 38, through which the transducer heads 20 are adapted to extend.

The intermediate section 36 has four equally spaced screw holes 39 for receiving four screws 40, which serve to attach the shield 33 to an annular rib 41 on a central turntable body 42. The central section 35 is provided with a pair of opposed holes 43, 43, for receiving a screw driver 44.

Mounted upon the turntable body 42 is a circular flexible filter coupling 45, having a small central driving disk 46 provided with four spaced apertures 47, two of which are in alignment with said holes 43, 43, the use of which will be described later.

The disk 46 is secured at its inner end by four small rivets 48 to the center of a flexible fabric diaphragm 49 and to a small central drive ring 50.

Provision is also made of eight rivets 51 for securing an outer ring 52 of the flexible coupling to a ring casting 53, said rivet also serving to clamp the outer edge of the diaphragm 49 tightly against said ring casting 53—the latter being secured to the turntable 32 by means of screws 54.

The turntable 32 is adapted to be driven by an undercut vertical drive spindle 55 which has a reduced threaded upper end 56 for detachable engagement in a tapped hole 57 formed in the small upper driving ring 50 of the filter coupling 45.

Figure 3:
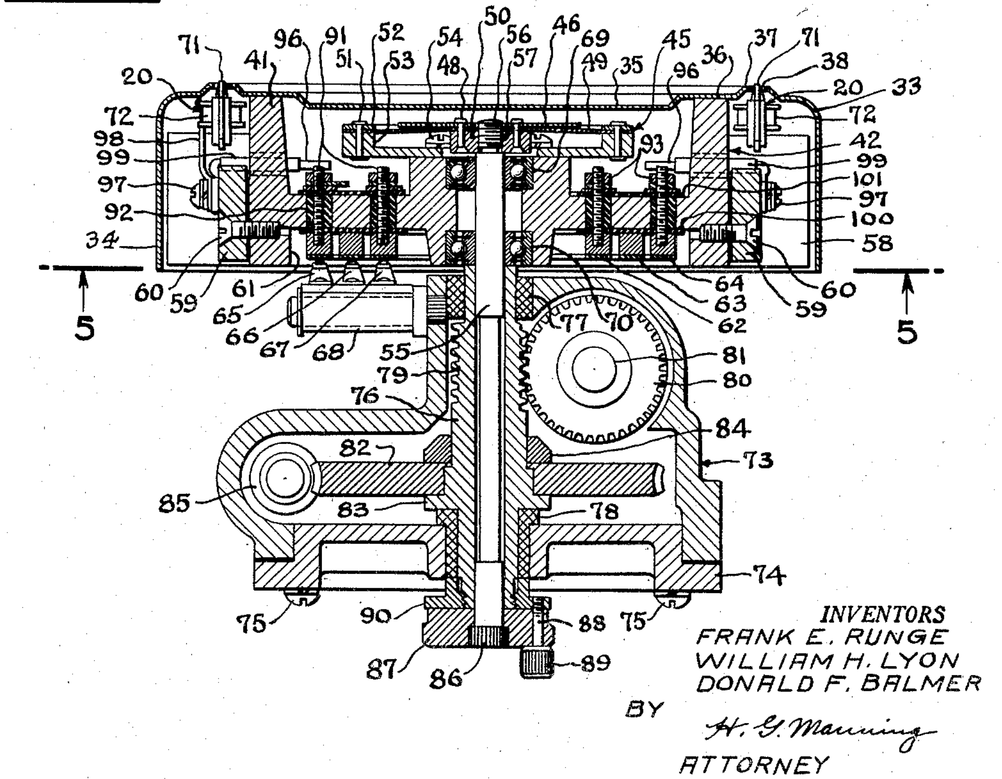
Fig. 3 is a vertical sectional view of the turntable and operating gearing taken along the line 3—3 of Fig. 2, looking in the direction of the arrows.
Figure 4:
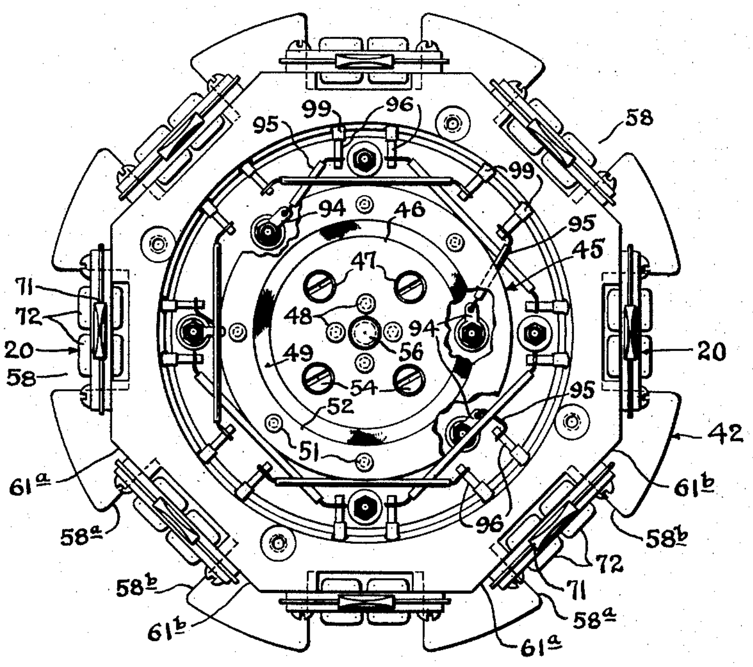
Fig. 4 is a top plan view of the turntable with its cover removed.
Figure 5:
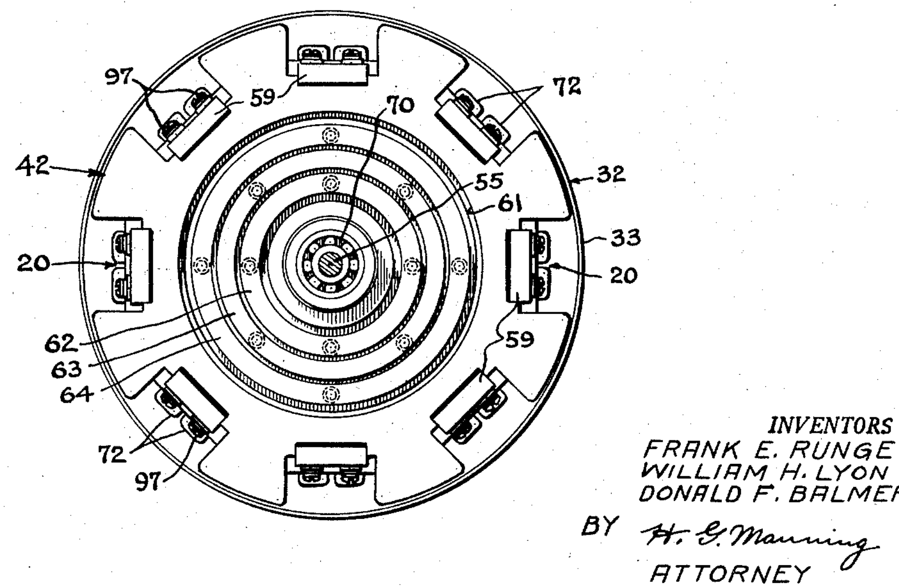
Fig. 5 is a bottom sectional view of the turntable, taken along the line 5—5 of Fig. 3, looking upwardly.
Figure 7:
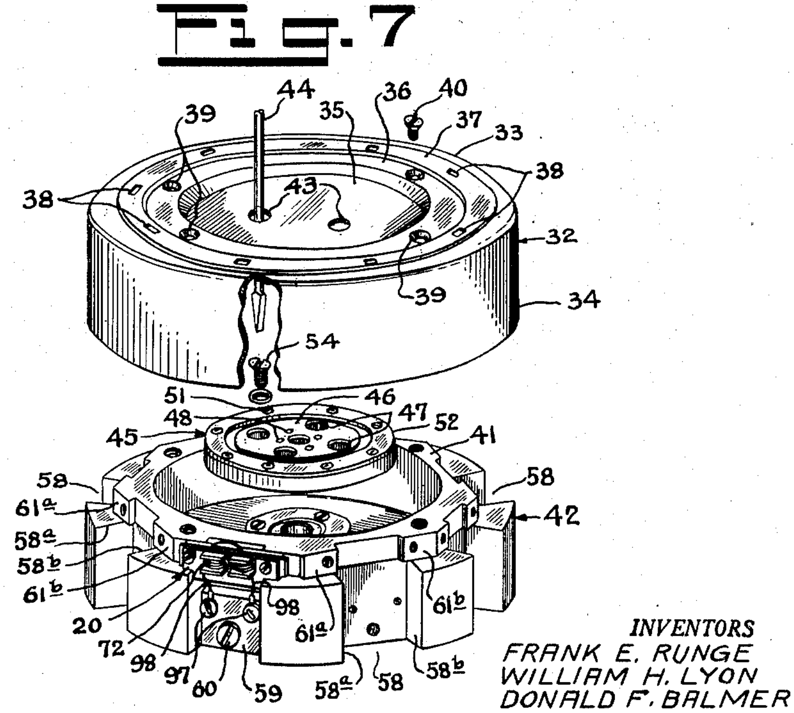
Fig. 7 is an exploded view showing the flexible filter coupling between the drive spindle and the body of the turntable.

The turntable body 42 is provided with eight outer radial recesses 58 (Fig. 4), within which are located a like number of terminal blocks 59 secured in place by screws 60, as most clearly shown in Figs. 3 and 7 in the drawings.

Figure 6:
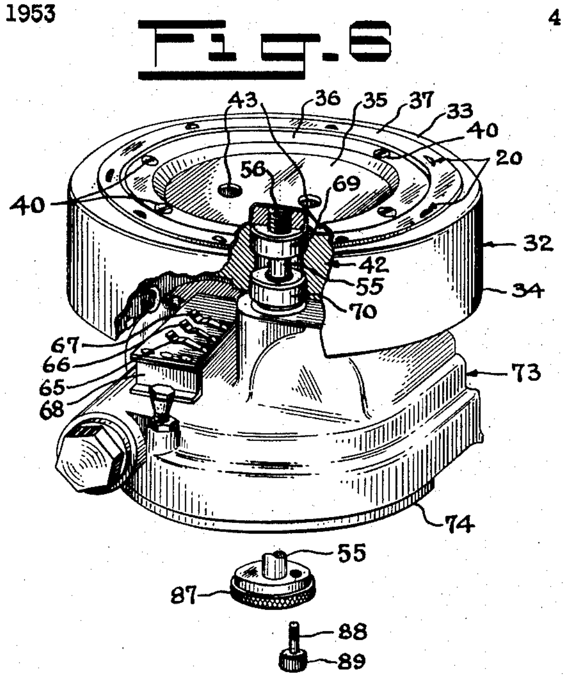
Fig. 6 is a perspective view of the turntable and its cover, the gear box, the supporting bearings, and the depressible spindle, with certain parts broken away to show the interior construction.

The bottom of the body 42 is provided with an annular recess 61 (Fig. 3), within which are located three concentric slip rings 62, 63, 64 for engagement with brushes 65, 66, 67 of the brush assembly 68 (Figs. 3 and 6). The turntable 32 is also provided with a pair of ball bearing assemblies 69, 70 for providing an anti-friction mounting for the drive spindle 55.

Each of the transducer heads 20 has a pair of looped magnet cores 71 which are energized by a pair of coils 72 embracing opposite sides thereof. Each core 71 and a pair of coils 72 are mounted within a hollow rectangular frame 72*a*.

Provision is also made on the turntable 32 of a gear box casing 73 having a bottom dished cover 74 secured to said casing 73 by screws 75 (Fig. 3).

Located within the gear box 73 is a vertical hollow shaft 76 surrounding the lower portion of the drive spindle 55 and mounted in "Oilite" bearings 77, 78 at the top and bottom portions thereof.

The hollow shaft 76 is provided with a worm section 79 which meshes with a tape drive gear 80 mounted on a horizontal shaft 81.

Provision is also made of a horizontal turntable drive gear 82 seated upon a shoulder 83 on a hollow shaft 76 and held in place frictionally by means of a retaining ring 84 which engages the upper surface of the drive gear 82. A motor driven worm 85 meshes with said gear 82.

In order to permit the spindle 55 to be quickly detached from the turntable 32 and dropped down through the center thereof for releasing said turntable laterally whenever it is desired to remove it, provision is made of a knurled section 86 on the bottom of the spindle 55, surrounded by a knurled ring 87 (Fig. 3).

In the outer portion of the ring 87 provision is also made of a vertical locking screw 88 having a knurled knob 89 on the lower end thereof for convenience in manipulation. The screw 88 is detachably secured in a tapped hole in a flanged collar 90.

The slip rings 62, 63, 64 are secured in place by a plurality of vertical screw studs 91 which are surrounded and held spaced from the turntable by insulating sleeves 92 (Fig. 3).

The studs 91 pass through lower and upper insulating disks 100, 101 located on each side of the turntable body. The upper disk 101 serves to space a plurality of nuts 93 which secure the studs 91 and slip rings 62, 63, 64 to the turntable, from the body of said turntable 32.

The lower disk 100 spaces and insulates the slip rings 62, 63, 64 from the body of the turntable 32.

Under certain of the studs 91, screw lugs 97 are mounted to permit electrical connections from the transducer heads 20 through leads 98, which connect the magnet coils 72 of the transducer heads 20 to the screw lugs 97 which serve as terminals for said leads.

Electrical connection from the terminals 97 to the interior of the turntable 32 is accomplished by a series of inwardly extending pins 96 which are embraced by tubular insulators 99.

The inner ends of the pins 96 are connected to each other and to horizontal terminal studs 94 by hook up wires 95.

The turntables are provided with a pair of outer ears 61*a*, 61*b* which are machined exactly at right angles to a radius midway between ears 58*a*, 58*b* of the recesses 58, the faces of said ears being milled within .0005 of an inch. If not so milled, the apparatus will not record properly. Moreover the radius of successive recesses 58 must be exactly 45 degrees apart, to permit interchangeability of the transducer heads 20.

*Operation*

In view of the fact that the magnetic transducer heads 20 of the turntable 32 will over a period of time, wear down by reason of their rubbing contact with the tape T, it is essential that provision be made for rapidly changing the turntable 32 in order to provide the minimum of interruption in the recording process. The purpose of the four holes 47 in the disk 46 is to permit the small drive ring 50 to be held from turning, by the insertion of a screw driver 44 through one of the holes 43 in the depressed section 35 of the shield 33. This is necessary in case the fabric diaphragm 49 should be torn completely away from the driven section of the flexible filter coupling 45, including the rivets 48 and the outer ring casting 53.

In other words, if the flexible filter coupling 45 should be torn, the drive spindle 55 could not otherwise be unscrewed from the filter coupling 45, but by inserting the screw driver 44 through the holes 43 and 47, as mentioned above, the drive ring 50 may be held in position to permit the unscrewing of said drive spindle 55.

It will be understood that since the speed of the drive shaft or spindle 55 may be modulated by a flutter caused by the operation of the drive gear 82 and worm 85, which might produce an undesirable effect upon the recording tracks, it is necessary to filter out this flutter before it reaches the recording heads.

This is accomplished by the use of the filter coupling 45 which flexibly joins the spindls 55 by means of the ring 56 and the yielding diaphragm 49 at the center ring casting 53 of the turntable body 42, by means of the attaching screws 54.

It will be understood that the inertia of the turntable body 42 is such that it will produce a flywheel effect causing flutter to be isolated from the gearing by means of the filter coupling.

It will be understood that the transducer heads 20 are connected in series in two groups. The center or neutral portion of said head is connected to the central slip ring 63 through the vertical screw studs 91 and the terminal lugs 94.

Also one side of one group of heads is connected to the outer slip ring 62, and the other side will be connected to the inner slip ring 64. Both units have their circuits completed by connection to the neutral center slip ring 63.

It will be understood that the ball bearings 69 will provide support for the heavy turntable at the top end of the hollow sleeve 76.

The lower ball bearings 70 serve to take the vertical thrust from the spindle 55 and both ball bearings 69, 70 support the turntable in all directions for reducing the friction from the drive spindle.

The brushes 65, 66, 67 serve to engage the rings 62, 63, 64 and connect the exterior head coils 72 to wiring leading to external electrical apparatus, not shown.

While there has been disclosed in this specification one form in which the invention may be embodied, it is to be understood that this form is to be shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In a long playing magnetic tape recording and reproducing apparatus, drive means for continuously advancing a magnetic tape longitudinally through said apparatus, a heavy, fly-wheel shaped turntable mounted to rotate on an axis at right angles to said tape and carrying a plurality of electro-magnetic spaced apart transducer heads located below the path of said tape, a drive spindle operated by said drive means for continuously rotating said turntable in timed relation to the movement of said tape, an insulated cover shield secured to said turntable for embracing said transducer heads, said cover shield having a raised protecting rib with a plurality of slots through which said transducer heads extend, said rib also serving to maintain said tape in smooth condition, said turntable comprising a heavy metallic casting, said drive spindle extending vertically through an axial opening in said casting, disconnectable resilient coupling means interconnecting the upper end of said spindle and the top of said casting for cooperative rotational motion therewith, a sleeve member surrounding the lower end of said drive spindle, the upper end of said sleeve member providing a thrust bearing for the underside of said casting, disconnectable coupling means interconnecting the lower end of said drive shaft and the lower end of said sleeve member, and a worm on said sleeve member, said drive means including a worm gear in mesh with said worm.

2. In a long playing magnetic tape recording and reproducing apparatus, drive means for continuously advancing a magnetic tape longitudinally through said apparatus, a heavy flywheel shaped turntable mounted to rotate on an axis at right angles to said tape and carrying a plurality of electro-magnetic spaced apart transducer heads located below the path of said tape, a drive spindle operated by said drive means for continuously rotating said turntable in timed relation to the movement of said tape, an insulated cover shield secured to said turntable for embracing said transducer heads, said cover shield having a raised protecting rib provided with a plurality of slots through which said transducer heads extend, said rib also serving to maintain said tape in smooth condition, a filter coupling interconnecting said drive spindle and said turntable, said filter coupling comprising a small central driving disk, and a flexible diaphragm secured at its center to said disk and at its outside edge to an outer ring which is rigidly connected to said turntable.

3. The invention as defined in claim 2, in which said turntable comprises a metallic casting, and a plurality of screws are provided for attaching said casting to the outer ring of said filter coupling.

4. The invention as defined in claim 2, in which said turntable comprises a metallic casting having a plurality of radial recesses formed in the edge thereof, the faces of said recesses extending radially with respect to the axis of said turntable and a plurality of terminal blocks, one located in each of said recesses for electrically connecting said transducer heads to an amplifier.

5. The invention as defined in claim 4, in which said casting is provided with an annular circumferential recess having a pair of outer ears for embracing each of said blocks, and means for connecting said blocks to a plurality of slip rings for conducting the current from a source of supply to a plurality of coils for energizing said transducer heads.

6. In a long playing interrupted-track magnetic tape recording and reproducing apparatus, means for continuously advancing a magnetic tape longitudinally through said apparatus, a heavy circular turntable mounted on an axis at right angles to said tape, carrying a plurality of electro-magnetic transducer heads equally spaced apart around the circumference of said turntable and concentric with the axis thereof, each of said transducer heads including an open frame tangent to a circle including said heads, a looped iron core in the center of each of said frames a pair of coils on said frame embracing the opposite sides of said core, said turntable having a central vertical aperture embracing a vertical driving spindle, disconnectable resilient coupling means interconnecting the upper end of said spindle and the top of said casting for cooperative rotational motion therewith, a sleeve member surrounding the lower end of said driving spindle, the upper end of said sleeve member providing a thrust bearing for the underside of said casting, disconnectable coupling means interconnecting the lower end of said driving shaft and the lower end of said sleeve member, and means for rotating said sleeve member for turning said turntable.

7. In a long playing interrupted-track magnetic tape recording and reproducing apparatus, means for continuously advancing a magnetic tape longitudinally through said apparatus, a heavy circular turntable mounted on an axis at right angles to said tape carrying a plurality of electro-magnetic transducer heads equally spaced apart around the circumference of said turntable and concentric with the axis thereof, each of said transducer heads including an open frame tangent to a circle including said heads, a looped iron core in the center of each of said frames, a pair of coils on said frame embracing the opposite sides of said core, said turntable comprising a circular casting having a central vertical aperture embracing a vertical driving spindle having a threaded upper end, a filter coupling secured to the top of said casting, said coupling including a flexible diaphragm, and a small drop ring secured to said diaphragm, said drop ring having a tapped hole for detachably receiving the threaded upper end of said spindle.

8. In a long playing interrupted-track magnetic tape recording and reproducing apparatus, means for continuously advancing a magnetic tape longitudinally through said apparatus, a heavy circular turntable mounted on an axis at right angles to said tape, carrying a plurality of electro-magnetic transducer heads equally spaced apart around the circumference of said turntable and concentric with the axis thereof, each of said transducer heads including an open frame tangent to a circle including said heads, a looped iron core in the center of each of said frames, a pair of coils on said frame embracing the opposite sides of said core, said turntable comprising a circular body having a plurality of equally spaced radial recesses formed in its outer edge, each of said recesses having radial side faces detachably embracing a terminal block, one of which is located in each recess, each of said transducer heads including an open frame tangent to a circle passing through said heads, a looped core mounted on said frame, a pair of coils embracing opposite sides of said core, said frame having a pair of shoulders in its lower side ends fitting over the side faces of said recesses.

9. The invention as defined in claim 6, in which the bottom of said turntable has a circular recess, a plurality of slip rings concentrically mounted in a common plane in said recess, a brush engaging the bottom surface of each slip ring, and means to electrically connect said slip rings to the transducer head coils and an amplifier.

10. The invention as defined in claim 6, in which said turntable comprises a circular body having a plurality of equally spaced radial recesses formed in its outer edge, each of said transducer heads including a looped iron core and a pair of rectangular coils embracing opposite sides of said core, the vertical outer faces of each pair of said coils being fitted into the side faces of one of said recesses.

11. In a long playing magnetic tape recording and reproducing apparatus, drive means for continuously advancing a magnetic tape longitudinally through said apparatus, a heavy flywheel shaped turntable mounted to rotate on an axis at right angles to said tape and carrying a plurality of electro-magnetic spaced apart transducer heads located below the path of said tape, a drive spindle operated by said drive means for continuously rotating said turntable in timed relation to the movement of said tape, an insulated cover shield secured to said turntable for embracing said transducer heads, said cover shield having a raised protecting rib with a plurality of slots through which said transducer heads extend, said rib also serving to maintain said tape in smooth condition, a filter coupling interconnecting said drive spindle to said turntable, said filter coupling comprising a small inner ring having a detachable connection with the upper end of said spindle, a thin central flat disk of larger diameter than said inner ring and secured thereto, a flexible circular diaphragm secured at its center between said ring and said disk, and an outer ring of larger diameter than said inner ring connecting the outer edge of said diaphragm to said turntable.

References Cited in the file of this patent

UNITED STATES PATENTS

| | | |
|---|---|---|
| 2,554,582 | Mollina | May 29, 1951 |
| 2,648,589 | Hickman | Aug. 11, 1953 |
| 2,743,318 | De Forest | Apr. 24, 1956 |
| 2,750,449 | Thompson et al. | June 12, 1956 |